(12) United States Patent
Bick

(10) Patent No.: US 7,869,306 B2
(45) Date of Patent: Jan. 11, 2011

(54) SYSTEM AND METHOD FOR AUTOMATIC DETECTION OF A SONAR CONTACT

(75) Inventor: Ernest T. Bick, Newhall, CA (US)

(73) Assignee: Northrop Grumman Guidance and Electronics Company, Inc., Los Angeles, CA (US)

( * ) Notice: Subject to any disclaimer, the term of this patent is extended or adjusted under 35 U.S.C. 154(b) by 233 days.

(21) Appl. No.: 12/176,764

(22) Filed: Jul. 21, 2008

(65) Prior Publication Data

US 2010/0014387 A1    Jan. 21, 2010

(51) Int. Cl.
*G01S 3/80* (2006.01)
(52) U.S. Cl. ..................................... 367/118
(58) Field of Classification Search ................ 367/118, 367/129; 382/281
See application file for complete search history.

(56) References Cited

U.S. PATENT DOCUMENTS

| | | | |
|---|---|---|---|
| 3,069,654 A | 12/1962 | Hough | |
| 5,432,753 A | 7/1995 | Maranda | |
| 6,356,647 B1 | 3/2002 | Bober et al. | |
| 6,865,477 B2 | 3/2005 | Nicosia et al. | |
| 7,209,031 B2 | 4/2007 | Nakai et al. | |
| 2005/0190951 A1 | 9/2005 | Shyu | |
| 2010/0014387 A1* | 1/2010 | Bick | .................. 367/107 |

OTHER PUBLICATIONS

Ballard, D.H.: "*Generalizing the Hough Transform to Detect Arbitrary Shapes*"; Computer Science Department, University of Rochester, Rochester, NY 04627, USA; Received Oct. 10, 1979; in revised form Sep. 9, 1980; received for publication Sep. 23, 1980; pp. 111-122.

* cited by examiner

*Primary Examiner*—Dan Pihulic
(74) *Attorney, Agent, or Firm*—Tarolli, Sundheim, Covell & Tummino LLP

(57) ABSTRACT

Systems and methods are provided for automatically detecting sonar contacts. The system comprises a data analyzer that integrates the raw data from a plurality of sonar detectors over a predetermined period of time, thereby providing integrated data characterizing a sonar image on a sonar display. A Hough transform module is configured to employ a Hough transform algorithm that transforms at least a portion of the integrated data to detect a substantially straight line in the sonar image.

20 Claims, 6 Drawing Sheets

SYSTEM AND METHOD FOR AUTOMATIC DETECTION OF A SONAR CONTACT

TECHNICAL FIELD

The present invention relates generally to sonar systems, and more particularly to systems and methods for automatic detection of a sonar contact.

BACKGROUND OF THE INVENTION

Sonar (for SOund NAvigation and Ranging) is a technique that uses sound propagation (usually underwater) to navigate, communicate or to detect other vessels or objects. There are two kinds of sonar—active and passive. Active sonar pulses sound waves through a medium (e.g., water) and receives waves reflected by the other vessels. Passive sonar only receives sounds waves propagated by the other vessels. Sonar may be used as a means of acoustic location. The term sonar is also used for the equipment used to generate and/or receive the sound waves. The frequencies used in sonar systems vary from infrasonic to ultrasonic. Detection of the other vessels with sonar (and particularly passive sonar) is inherently difficult. The primary difficulty is the variation of the received acoustic signal resulting from a complex propagation structure of the medium (e.g., an ocean) through which sound waves are transmitted. The received signal may, for instance, have transitioned through a spectral region of elevated broadband noise produced by a noisy surface vessel.

Detection of a sonar contact by standard spatial and time domain processing to optimize the target signal-to-noise ratio can be employed in passive sonar systems. An estimation of target position and velocity from passive sonar bearings can be referred to as bearings-only target motion analysis (TMA). Signal detect-before-track methods are intended to produce a reliable track of sonar contact. Unfortunately, detect-before-track methods are limited by the integration time consistent with a sonar contact's kinematics. A computed acoustic power at bearings over a sonar system's field-of-view and low signal-to-noise ratios are insufficient for reliable TMA solutions. Some techniques have been proposed to increase the integration time. These techniques increase the integration time by combining detection and localization operations into track-before-detect algorithms. In such cases, TMA methods are still employed, usually requiring a search over a large number of hypothesized target tracks and finding the hypothesized track that maximizes a long-term integrated power computed for each hypothesized track.

SUMMARY OF THE INVENTION

One aspect of the present invention is related to a system for automatically detecting sonar contacts. The system comprises a data analyzer that integrates the raw data from a plurality of sonar detectors over a predetermined period of time, thereby providing integrated data characterizing a sonar image on a sonar display. A Hough transform module is configured to employ a Hough transform algorithm that transforms at least a portion of the integrated data to detect a substantially straight line in the sonar image.

Another aspect of the invention is related to a system for automatically detecting sonar contacts. The system comprises means for integrating data into data points that characterizes detected sonar beams from at a plurality of different positions, thereby generating integrated data. The system also comprises means for transforming at least a portion of the integrated data into a Hough space that characterizes the data points as straight lines. The system further comprises means for accumulating intersections of the straight lines.

Yet another aspect of the invention is related to a method for automatically detecting sonar contacts. The method comprises storing raw data from a plurality of sonar detectors. The method also comprises integrating the raw data over a predetermined integration time, thereby generating integrated data, wherein the integrated data characterizes a two-dimensional Euclidian space. The method further comprises transforming the integrated data into a Hough space. The method yet further comprises detecting intersecting lines in the Hough space.

DETAILED DESCRIPTION OF THE DRAWINGS

Raw data can be provided from a plurality of sonar detectors of a sonar system to a controller. If the raw data is integrated over a period of time, the raw data can characterize a bearing vs. time (BTR) image. The BTR image can characterize a energy detected by the plurality of sonar detectors over the predetermined period of time. A controller can be employed in the sonar system that can analyze the BTR image to detect a presence and bearing of a sonar contact and/or target, such as a marine vessel, hereinafter ("sonar contact").

Typically, a user of the sonar system visually scans the BTR image to determine the presence and/or bearing of the sonar contact. For weaker signals, the sonar contacts are barely distinguishable from random and/or background noise. The controller of the present system can automate the actions of the user to decide if a sonar contact is detected in the BTR image. The controller can apply a Hough transform to detect straight lines in the BTR image that corresponds to a bearing of the sonar contact. The Hough transform can be employed in image processing as a feature detector for the BTR image to automatically detect connected detections appearing along lines or simple curves in the BTR image. The controller can thus integrate sonar detector power over many detection processing epochs and potential simple shapes that connect individual display detections.

The controller can apply an inverse Hough transform to generate data that identifies areas in the image that the straight lines are located. The controller can provide information to a user of the system to assist the user in identifying a presence and/or a bearing of the sonar contact. In contrast to a target motional analysis sonar system, the present system does not need to extract discrete estimates of a target bearing (e.g., hypothesized target tracks).

Figure 1:
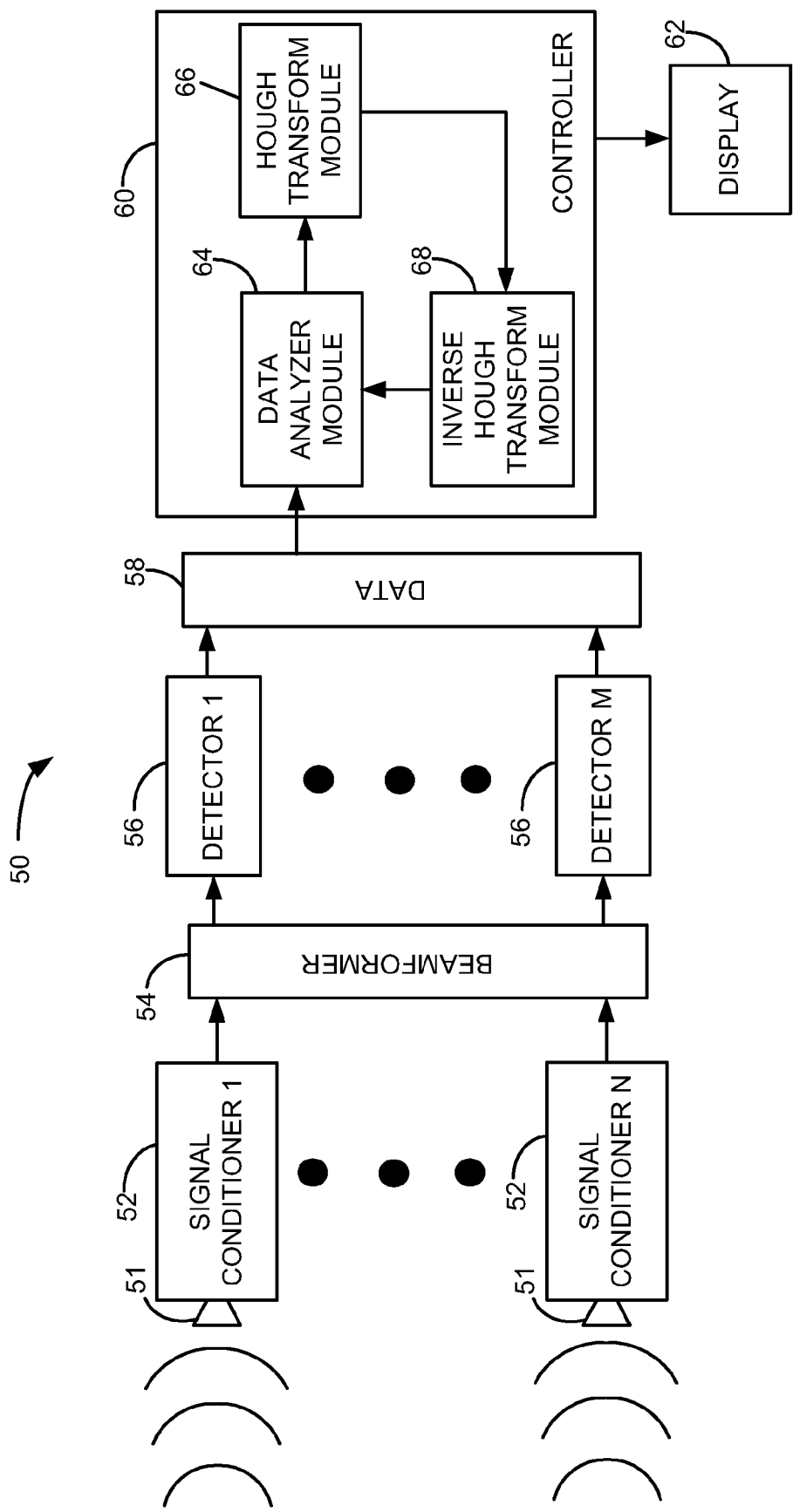
FIG. 1 illustrates an exemplary system for automatically detecting a sonar contact in accordance with an aspect of the invention.

FIG. 1 illustrates an exemplary system 50 for automatically detecting a presence and bearing of a sonar contact in accordance with an aspect of the invention. The system 50 can be employed in a track-before detect sonar system. The bearing represents, for example, a direction and rate of travel for the sonar contact. The system 50 could be implemented, for example, as a passive sonar system, although it is considered that the system 50 could be implemented as an active sonar system as well. In one example, the system 50 could be implemented on a marine vessel, such as a ship or a submarine. In such a situation, the sonar contact detected by the system 50 could be, for example, another marine vessel or a marine life form (e.g., a fish).

The system 50 includes N number of hydrophones 51 and signal conditioners 52, where N is an integer greater than one. As an example, the hydrophones 51 can be implemented as sonar (e.g., sound wave) transducers. Each of the hydrophones 51 can for example, convert (transduce) sound energy into electrical energy (e.g., electrical waves), and provide the transduced signal to a corresponding signal conditioner 52. Each of the signal conditioners 52 can employ an amplifier and/or a filter to condition the transduced signals. The signal conditioners 52 can output the conditioned transduced signals as hydrophone signals. The hydrophones 51 could be mounted on the marine vessel in such a way that the plurality of signal conditioners 52 can process sonar signals incoming in a specific field of view. The hydrophone signals output by each of the signal conditioners 52 can be focused by a beamformer 54, such that the beamformer 54 can generate beam signals that characterize the transduced signals at a particular point in time for the entire field of view. The beam signals could be implemented as either analog or digital signals. The beamformer 54 can provide the beam signals to M number of detectors 56, where M is an integer greater than one. Each of the M number of detectors 56 can receive a beam signal from the beamformer 54. The field of view could be, for example, about 180 degrees. In such a situation, there could be 180 detectors 56 in the field of view, such that each of the detectors 56 receives a beam signal associated with a relatively narrow portion of the field of view (e.g., about a 1 degree arc). For purposes of simplification explanation, it will be assumed that there are 180 detectors 56 in the present example.

Each of the M number of detectors 56 can determine a detected energy level corresponding to the received beam signal. Each of the M number of detectors 56 can provide raw data that characterizes the detected energy level of an associated beam signal. The detectors 56 can store the raw data at a data storage 58. The data storage 58 could be implemented, for example, as volatile or nonvolatile memory (e.g., random access memory (RAM)). The raw data can be provided to a controller 60. In one example, the raw data can be updated by the detectors 56 every one second. The controller 60 could be implemented, for example, as hardware, software or a combination thereof. The controller 60 can be configured to store the raw data for a predetermined period of time. The predetermined period of time can be based, for example, on an operating condition of the marine vessel on which the system 50 is implemented. For example, in high alert operating conditions (e.g., war games, combat, etc.) a shorter predetermined period of time, such as about 5 seconds can be selected. Conversely, in low alert operating conditions (e.g., normal maneuvers) a longer predetermined time, such as about 60 seconds can be selected. In the present example, for purposes of simplification of explanation, it will be assumed that the predetermined time is about 15 seconds.

The controller 60 can be configured to output information corresponding to the raw data on a visual display 62 (e.g., a computer screen). The information can be output, for example, as an image that represents an energy level detected for each of the 180 detectors 56 over the predetermined time of about 15 seconds. The image can be referred to as a BTR image (e.g., a sonar image). In such a situation, the BTR image can represent a Euclidian space that characterizes a detected bearing vs. time. The raw data can thus be implemented as a data array (e.g., a matrix) that includes data cells that characterize each plot point (e.g., each pixel) in the BTR image. In one example, each point in the BTR image can represent an analog value corresponding to a detected energy from an associated sonar detector at a particular time.

Additionally, the controller 60 can include a data analyzer 64 that retrieves and processes the raw data. The data analyzer 64 can employ an energy threshold algorithm to the raw data to determine which points within the raw data correspond to a detected energy above a predetermined threshold value, which can be referred to as energy threshold data. The predetermined threshold value can correspond, for example, to a minimum energy level that indicates a relatively high probability of the presence of a sonar contact. In one example, application of the energy threshold algorithm can manipulate the raw data such that at each point in the BTR image above the energy threshold is represented as a binary value (e.g., a 1 or a 0), instead of an analog value. Moreover, application of the energy threshold algorithm can be employed to reduce and/or eliminate random and/or background noise present in the BTR image.

The data analyzer 64 can be configured and/or programmed to provide the energy threshold data (or some portion thereof) to a Hough transform module 66 in the form of binary data (e.g. '1's and '0's). The Hough transform module 66 can implement a Hough transform algorithm that detects straight lines within an array of points in Euclidian space. As one example, the array of points can characterize a filtered image that can be displayed on the visual display 62 (e.g., a computer monitor). The Hough transform algorithm can be implemented with the following equations:

$$\theta_0 = \theta_i - \dot{\theta}_i t; \ i=1:N_T \qquad \text{Eq. 1}$$

where $\theta_0$ is an initial bearing (hereinafter, "bearing intercept") of a sampled sound wave at one of the 180 detectors 56;

$\theta_i$ is the bearing for the ith threshold energy detection;

$\dot{\theta}_i$ is bearing rate of change, hereinafter ("bearing rate");

i is the energy threshold crossing index; and $N_T$ is the number of points in the data array that cross the energy threshold.

$$D = w_i \begin{bmatrix} t_i \\ \theta_i \end{bmatrix} \qquad \text{Eq. 2}$$

$$H = \begin{bmatrix} -\dot{\varphi}_1 & 1 \\ \vdots & \vdots \\ -\dot{\varphi}_{N_s} & 1 \end{bmatrix}; N_s * 2 \text{ point array} \qquad \text{Eq. 3}$$

-continued $$\Phi = HD = \begin{bmatrix} w_1*(-\dot{\varphi}_1*t_1+\theta_1) & w_{N_t}*(-\dot{\varphi}_{N_1}*t_{N_t}+\theta_{N_t}) \\ \vdots & \vdots \\ w_1*(-\dot{\varphi}_{N_s}*t_1+\theta_1) & w_{N_t}*(-\dot{\varphi}_{N_s}*t_{N_t}+\theta_{N_t}) \end{bmatrix}; N_s * \text{ 2 point array}$$ Eq. 4 where D is the array of points to be transformed (e.g., the energy threshold data);

$w_i$ is a value assigned to the energy threshold crossing index i;

H is a Hough transform matrix;

$N_S$ is the number of discrete bearing slopes employed by the Hough transform algorithm; and $\Phi$ is an array of detected bearing-time cells transformed into Hough space.

When the data array is transformed by the Hough transform algorithm, a point in the BTR image corresponds to a two parameter family, namely bearing rate and bearing intercept. Additionally, a point in Hough space corresponds to a straight line in the BTR image.

The Hough transform module 66 can be configured to accumulate intersections of lines of the transformed data ($\Phi$). Points on the same straight line in the BTR image correspond to lines through a common point in Hough Space, while points on the same line in Hough space correspond to lines through the same point in the BTR image. For example, the Hough transform module 66 can employ a Hough threshold algorithm that applies a Hough threshold to the accumulated data that represents a predetermined minimum number of intersecting lines, which data can be referred to as Hough threshold data. The predetermined minimum number of intersecting lines can be based, for example, on the sensitivity of the detectors 56, the predetermined integration time, etc. The Hough threshold data can be provided, for example, to an inverse Hough transform module 68.

The inverse Hough transform module 68 can employ an inverse Hough transform algorithm to inversely transform (e.g., return) the Hough threshold data to Euclidian space, which data can be referred to as inverse Hough data. The inverse Hough transform algorithm can employ the following equation to perform the inverse Hough transform:

$$\Phi_k(t) = \hat{\Theta}_i(t_0) + \hat{\Theta}_k * t$$ Eq. 5 where $\Phi_k$ is a bearing for sonar contact k at time t;

$\hat{\Theta}_k(t_0)$ is the initial bearing for the sonar contact k; and $\hat{\Theta}_k$ is the bearing rate for the sonar contact k.

The inverse Hough transform module 68 can provide the inverse Hough data to the data analyzer 64. The data analyzer 64 can perform a clustering function on the inverse Hough data that determines if multiple detected sonar contacts correspond to the same physical entity. The output of the clustering function can be referred to as contact data. The contact data can be stored in the data storage 58. The controller 60 can provide accurate contact data in environments of application with a significant amount of noise, such as an ocean.

The controller 60 can output data on the visual display 62 that characterizes the contact data. The data characterizing the contact data can, for example, provide information to a user of the system 50 that assists the user in determining the location and bearing of a sonar contact. As one example, the information provided to the user can direct the user to a particular portion of the BTR image (e.g., the sonar image) displayed on the visual display 62. Additionally or alternatively, the information provided to the user could be employed to display an image on the display that represents the one or more sonar contacts and their associated bearings. One skilled in the art will appreciate that other implementations are possible as well.

Figure 2:
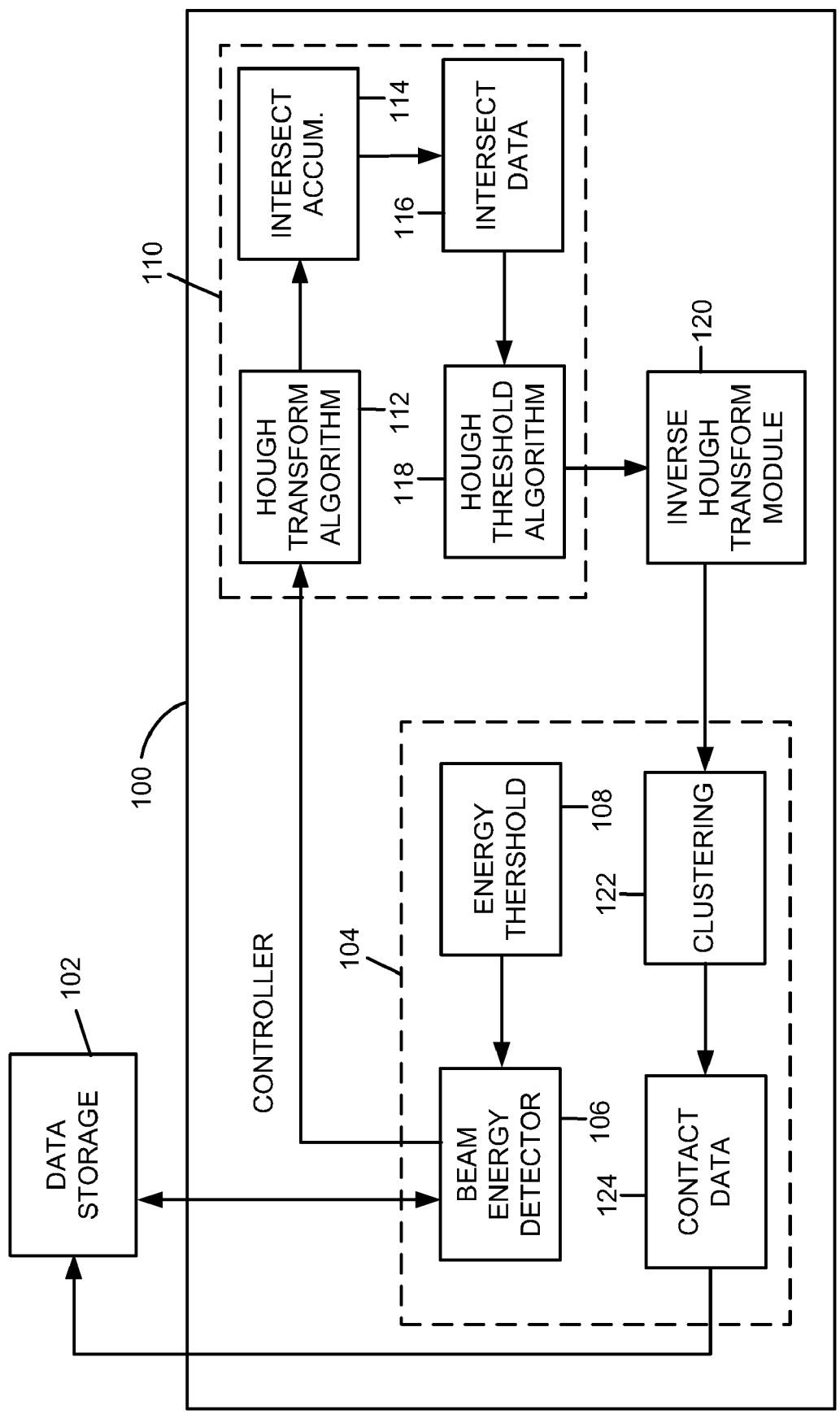
FIG. 2 illustrates a controller that can be employed in an exemplary system for automatically detecting a sonar contact in accordance with an aspect of the invention.

FIG. 2 illustrates an example of a controller 100 that can be employed in a sonar system in accordance with an aspect of the invention. The sonar system could be employed, for example, on a marine vessel to detect a bearing of one or more sonar contacts (e.g., other marine vessels, marine life forms, etc.). The controller 100 can access a data storage 102 that contains data output by a plurality of sonar detectors (e.g., the detectors 56 illustrated in FIG. 1), which output can be referred to as raw data. The data storage 102 could be implemented, for example, as RAM. In one example, the data storage 102 can store raw data output over a predetermined period of time (e.g., 15 seconds), which can be referred to as an integration time. The predetermined period of time can be adjusted, for example, based on the operating conditions of the marine vessel. Typically, the plurality of sonar detectors updates the raw data periodically (e.g., every second). The raw data integrated over the predetermined time can characterize a BTR image (e.g., a sonar image).

Figure 3:
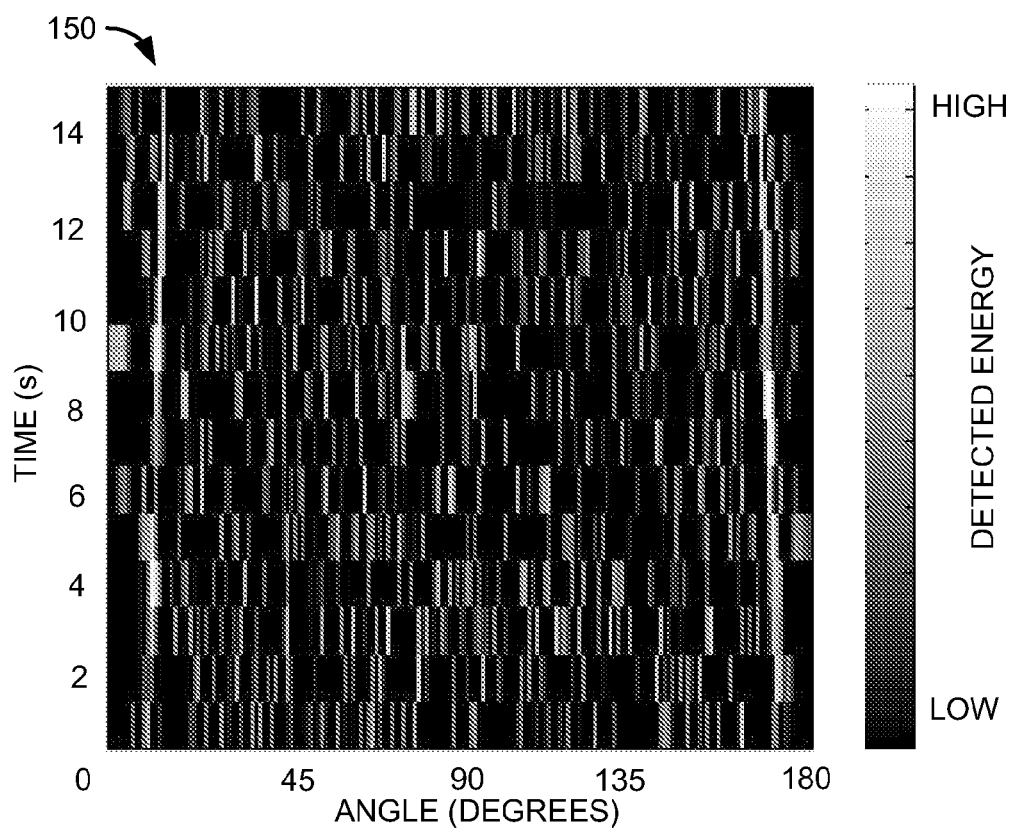
FIG. 3 represents a Bearing vs. Time (BTR) image in accordance with an aspect of the invention.

FIG. 3 illustrates an example of a BTR image 150 that could be characterized by the raw data integrated over 15 seconds. The BTR image 150 depicts an example of a detected energy at an associated sonar detector vs. time graph for 180 sonar detectors. Each point plotted in the BTR image 150 can represent an analog value that characterizes a detected energy level (e.g., beam energy) of the associated sonar detector at a particular instance in time. The analog value can be represented, for example, with an intensity of the plotted point (e.g., pixel intensity).

Referring back to FIG. 2, the controller 100 can include a data analyzer 104 that can access the data storage 102 and retrieve the raw data. The data analyzer 104 can include a beam energy detector 106 that can analyze the raw data to generate beam energy data that represents beam energy for each of the plurality of beam signals received by the plurality of detectors over the integration time. An energy threshold module 108 of the data analyzer 104 can be configured to filter out data that does meet or exceed a predetermined minimum energy threshold; the filtered data can be referred to as energy threshold data. The filtered out data can correspond, for example to random and/or background noise. As an example, the predetermined minimum energy threshold can correspond to a minimum detected energy level at an associated sonar detector that would likely indicate the presence of a sonar contact of interest. Application of the energy threshold can manipulate data characterizing the BTR image such that each pixel in the BTR image that indicates a detected energy above the predetermined threshold value can be represented with a binary value (e.g., 1 or 0). The energy threshold data can be provided to a Hough transform module 110 at a Hough transform algorithm 112.

Figure 4:
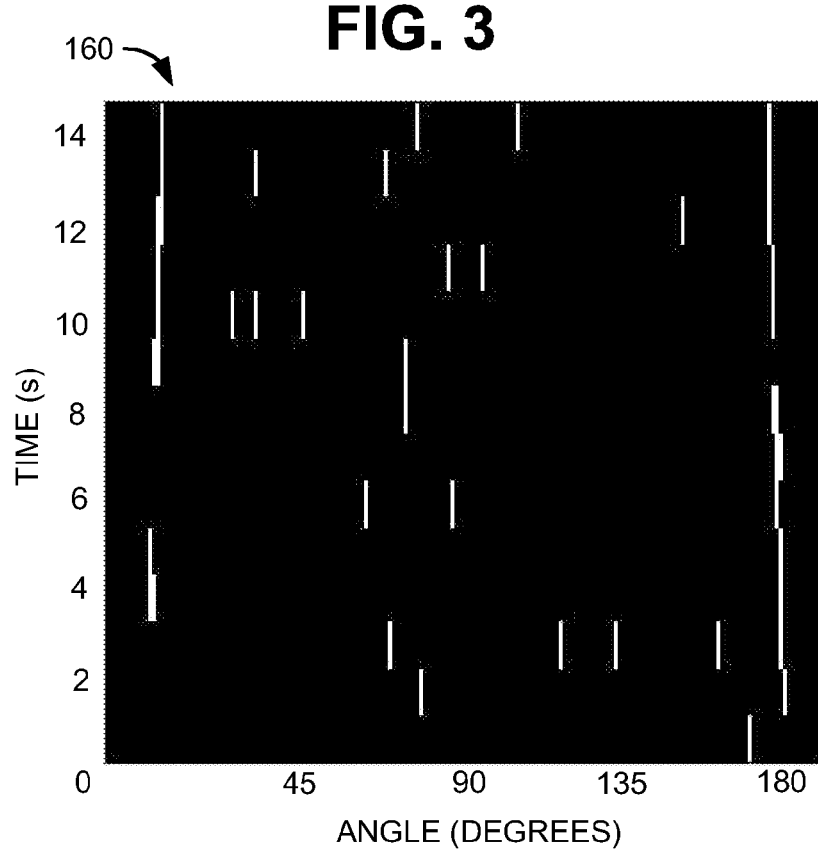
FIG. 4 illustrates an example of a BTR image after an energy threshold has been applied in accordance with an aspect of the invention.

FIG. 4 illustrates an example of a BTR image 160 to which the predetermined minimum energy threshold has been applied. The BTR image 160 depicts an example of a detected energy at an associated sonar detector vs. time graph. The BTR image 160 can represent, for example, the BTR image 150 illustrated in FIG. 3 after application of the predetermined threshold to reduce and/or eliminate detected random and/or background noise.

Referring back to FIG. 2, as an example, the energy threshold data can be implemented as an LxP data cell (e.g., two-dimensional) data array that can represent points in Euclidian space. In such a situation, L can be equal to the number of sonar detectors associated with the marine vessel for a given field of view, while P can be equal to the number of seconds of the predetermined integration time. Each data cell can be represented by a 1×2 data array that includes a given time and a detected bearing at the given time.

The Hough transform algorithm 112 can transform the energy threshold data into a Hough space by employing a Hough transform. The Hough transform algorithm 112 can employ Equations 1-4 discussed above with respect to FIG. 1 to transform the energy threshold data into the Hough space, wherein the transformed data can be referred to as Hough data. The Hough data can be plotted as a series of lines, wherein each line corresponds to a point in the energy threshold data.

Figure 5:
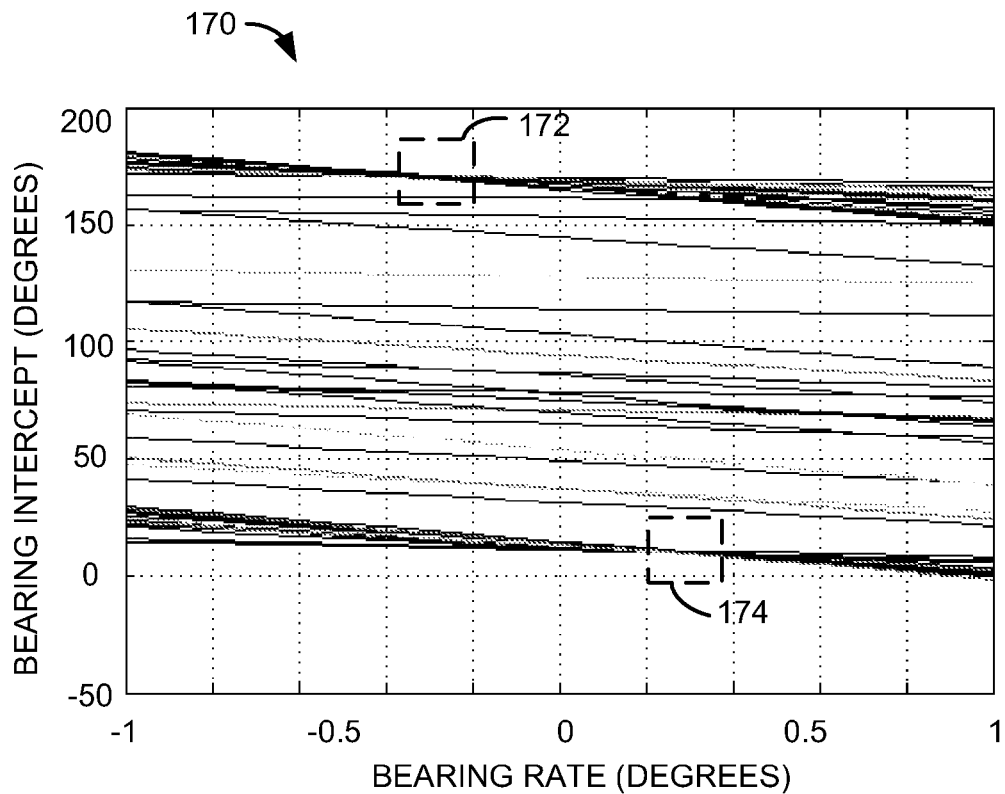
FIG. 5 illustrates an example of graph depicting a Hough space graph in accordance with an aspect of the invention.

FIG. 5 illustrates an example of a Hough space graph 170 wherein a bearing intercept is plotted as a function of bearing rate. In the Hough space graph 170 every plotted line can correspond to a point in Euclidian space (e.g., the BTR image 160 illustrated in FIG. 4). In the Hough space graph 170, a substantial number of line intersections exist at areas indicated at 172 and 174.

Referring back to FIG. 2, the Hough data can be provided to an intersection accumulator 114 of the Hough transform module 110. The intersection accumulator 114 can evaluate the Hough space and determine which points in Hough space have intersecting lines (e.g., areas 172 and 174 illustrated in FIG. 4). The intersection accumulator 114 can record intersect data 116 that represents the position of all points in Hough space with intersecting lines, as well as the number of intersections at a given point.

Figure 6:
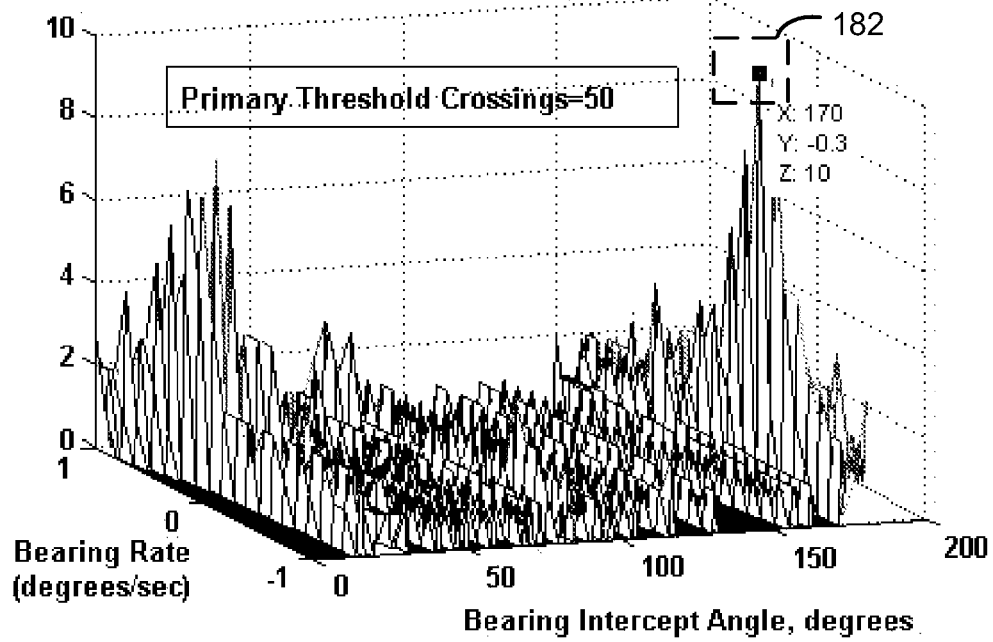
FIG. 6 illustrates an example of a graph depicting Hough line intersections plotted as a function of bearing rate and bearing intercept in accordance with an aspect of the invention.

FIG. 6 illustrates an example of graph 180 depicting Hough line intersections plotted as a function of bearing rate and bearing angle intercept. The graph 180 can correspond, for example, to the Hough space graph 170 illustrated in FIG. 5. As shown, the graph depicts the Hough Line intersections caused by 50 different lines in Hough space. At an area indicated at 182, a point is identified wherein about 10 Hough Line intersections (characterized by a 'Z' axis) occur at a bearing rate (characterized by a 'Y' axis) of about −0.3 degrees with a bearing intercept (characterized by an 'X' axis) of about 170 degrees.

Referring back to FIG. 2, the intersect data 116 can be provided to a Hough threshold algorithm 118 of the Hough transform module 110. The Hough threshold algorithm 118 can filter the intersect data 116 by applying a minimum threshold that represents a minimum number of line intersections in Hough space at a given point. The points in the Hough space that have the minimum number of intersections can be recorded as Hough threshold data (e.g., the point in area 182 depicted in FIG. 6). The Hough threshold data can be provided to an inverse Hough transform module 120. The inverse Hough transform module 120 can apply an inverse Hough transform to inversely transform the Hough threshold data into Euclidian space. To execute the inverse Hough transform, the inverse Hough transform module 120 can employ, for example, Equation 5 discussed above with respect to FIG. 1. The data inversely transformed by the inverse Hough transform module 120 can be referred to as inverse Hough data, and can be provided to a clustering function 122 of the data analyzer 104. The inverse Hough data can represent, for example, one or more straight lines that characterize a determined sonar contact bearing as a function of time.

The clustering function 122 can examine the inverse Hough data to determine if two or more straight lines in the inverse Hough data correspond to the same sonar contact. For example, due to inherent scattering of sound waves that occurs as sound waves travel through a typical medium (e.g., water or air), or due to limits of a beamformer's special resolution, a plurality of sonar detectors at different beamformer angles and/or times can receive beam signals that result in multiple instances of threshold data that lie along closely spaced lines in the BTR image and originate from the same sonar contact. Thus, the clustering function 122 makes the aforementioned determination, and if such a situation exists (it is determined that at least two lines in the inverse Hough data correspond to the same sonar contact), the at least two lines can be merged into one. The determination can be based, for example, on a relative proximity of the at least two lines. The clustering function 122 can output contact data 124 that represents lines that characterize a bearing of a sonar contact as a function of time. Each line in the contact data 124 corresponds to a different detected sonar contact.

The data analyzer 104 can store the contact data 124 in the data storage 102. The controller 100 can be configured to display contact information on a visual display (not shown) that characterizes the contact data 124. The contact information could be implemented as text, or one or more pictures that assist a user of the sonar system to determine a bearing of one or more sonar contacts. Additionally, the controller 100 could be configured to display information that characterizes the raw data over the integration time (e.g., a BTR or sonar image).

Figure 7:
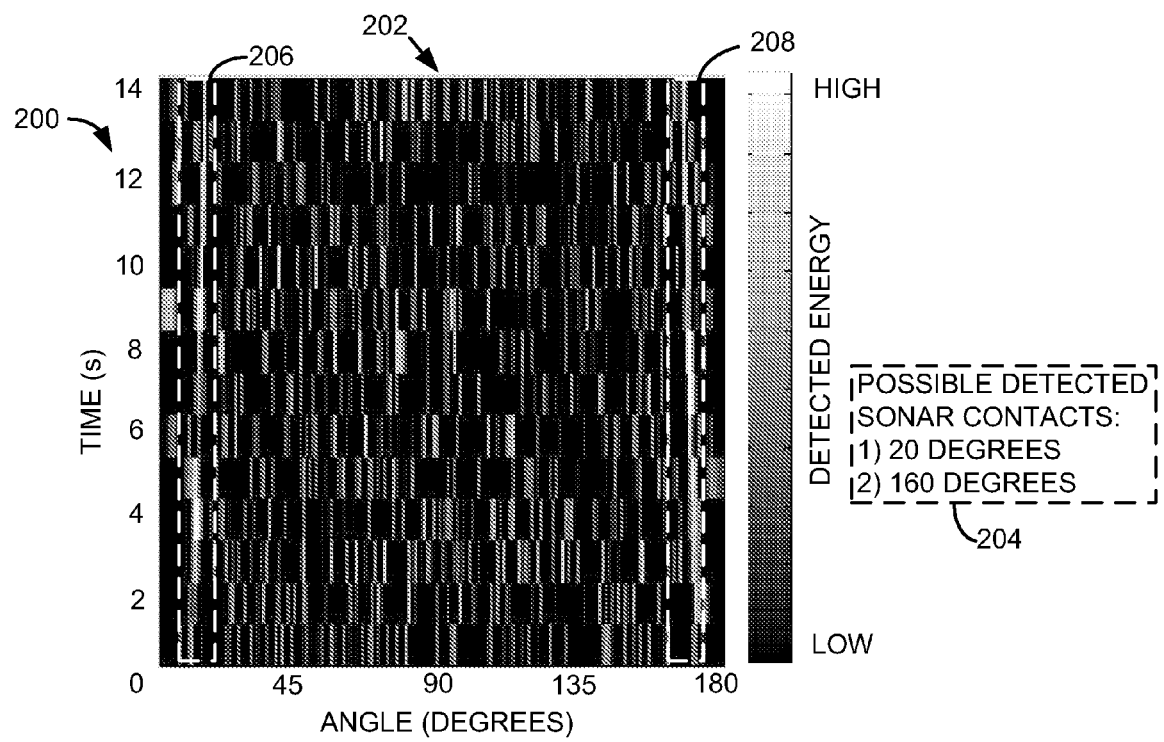
FIG. 7 illustrates an example of an output display of a sonar system in accordance with an aspect of the invention.

FIG. 7 represents an example of an output of a display 200 of a sonar system in accordance with an aspect of the invention. In FIG. 7, the display 200 displays both, a plot 202 that provides information (e.g., a BTR image) that characterizes data received from a plurality of sonar detectors (e.g., raw data), as well as contact information 204 (e.g., the contact data 124 illustrated in FIG. 2). In FIG. 7, signal strength from 180 different sonar detectors spaced apart by a 1 degree arc radius (e.g., raw data) is displayed over an integration time of 15 seconds. The signal strength can be represented, for example, by an intensity of plotted points (e.g., pixel intensity). Most of the information characterizing the raw data would be seen by a user of the system as random noise. However, the plot 202 includes two areas, indicated at 206 and 208, respectively with relatively strong signal strengths over the integration time.

By employing a controller in accordance with an aspect of the invention, (e.g., the controller 100 illustrated in FIG. 2), the raw data can be examined with a Hough transform to determine directions from the marine vessel that a sonar contact likely exists. Upon examination, the contact information 204 can be output to the user of the sonar that directs the user's attention to specific areas of the plot 202. In the present example, the contact information 204 would direct the user to the area of the screen that included areas 206 and 208.

Figure 8:
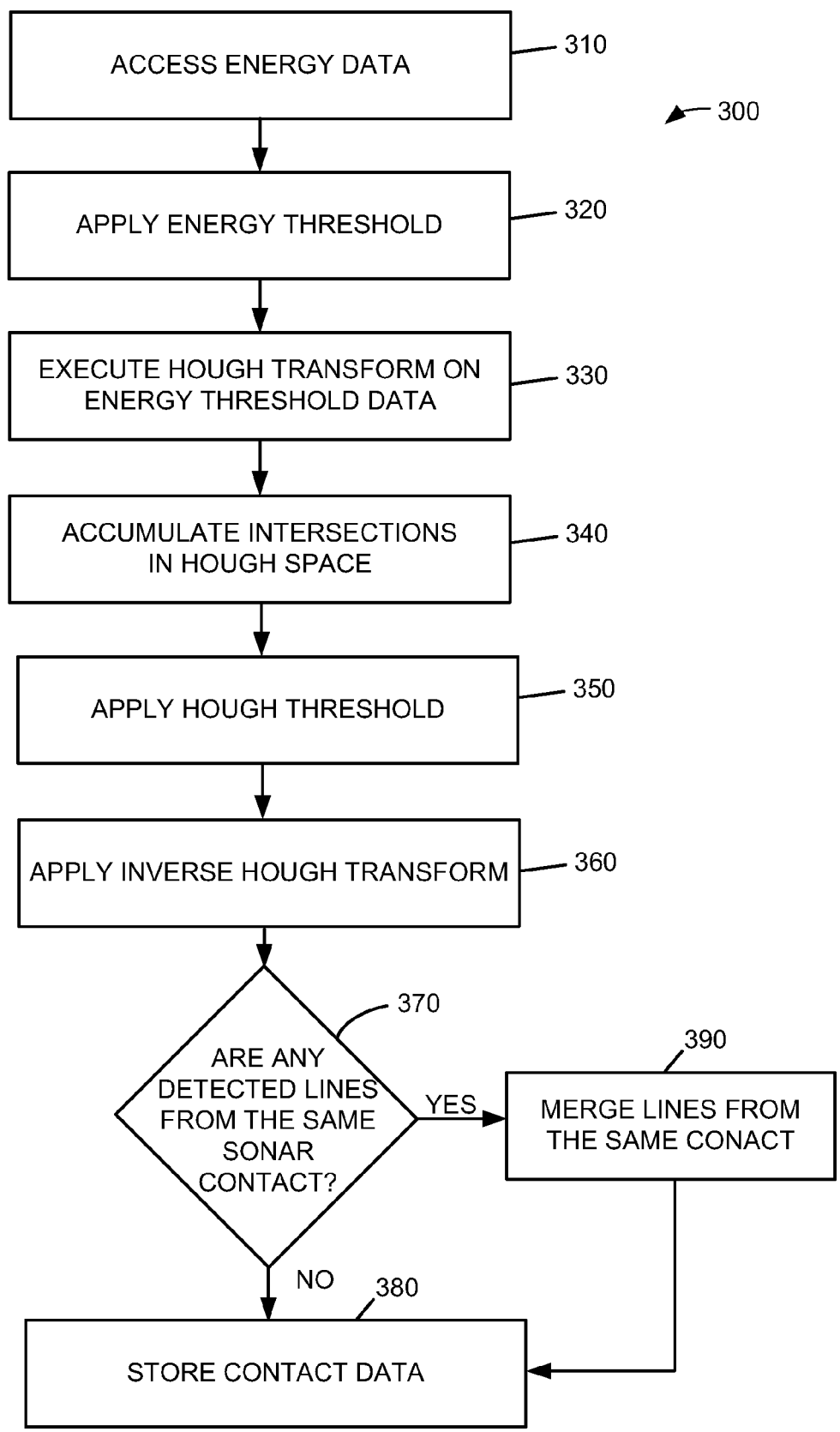
FIG. 8 illustrates an example of a flow chart of a methodology for automatically detecting a sonar contact in accordance with an aspect of the invention.

In view of the foregoing structural and functional features described above, methodologies will be better appreciated with reference to FIG. 8. It is to be understood and appreciated that the illustrated actions, in other embodiments, may occur in different orders and/or concurrently with other actions. Moreover, not all illustrated features may be required to implement a method.

FIG. 8 illustrates a flow chart of a methodology 300 for detecting a sonar contact with a sonar system in accordance with an aspect of the invention. The sonar system could be, for example, a passive sonar system. At 310 raw data corresponding to data received from a plurality of sonar detectors over an integration time (e.g., 15 seconds) can be accessed. The data could be, for example, a data array that characterizes an image in a Euclidian space, such as a BTR image (e.g., a sonar image). As one example, the BTR image could correspond to the BTR image 150 illustrated in FIG. 3. At 320, an energy threshold can be applied to the raw data that filters out data points in the data that indicate a detected energy level below the predetermined energy threshold value, the filtered data can be referred to as energy threshold data. The filtered BTR image could correspond, for example, to the BTR image 160 illustrated in FIG. 4. Application of the energy threshold could reduce and/or eliminate random and/or background noise detected by the plurality of sonar detectors. The energy threshold data could be implemented as binary data (e.g., '1's and '0's).

At 330, a Hough transform can be executed on the energy threshold data to transform the energy threshold data into a Hough space. The Hough transform could be executed, for example, by employing Equations 1-4 discussed above with respect to FIG. 1. FIG. 5 illustrates an example of a Hough space graph 170. At 340, intersections of lines in the Hough space are accumulated. Data characterizing the intersections of the lines can referred to as intersect data. At 350, a Hough threshold can be applied to the intersect data to filter out the intersections that have less than a predetermined Hough threshold value of intersecting lines. FIG. 6 illustrates an example of graph 180 depicting Hough line intersections plotted as a function of bearing rate and bearing angle intercept. The data filtered by the Hough threshold can be referred to as Hough threshold data.

At 360, the Hough threshold data can be inversely transformed with an inverse Hough transform algorithm. The inverse Hough transform algorithm transforms the Hough threshold data to lines that characterize a bearing of a detected sonar contact in Euclidian space. The inverse Hough transform can employ, for example, Equation 5 discussed above with respect to claim 1. Data transformed by the inverse Hough transform algorithm can be referred to as inverse Hough data. At 370, a determination is made as to whether any of the lines in the inverse Hough data are associated with the same sonar contact. If the determination is negative (NO), the methodology 300 proceeds to 380. If the determination is positive (YES), the methodology 300 proceeds to 390. At 380, contact data that characterizes a detected bearing for a sonar contact as a function of time is stored. At 390, lines that are associated with the same detected sonar contact are merged, and the methodology proceeds to 380. Additionally, it is to be understood the methodology 300 can be repeated indefinitely, such that the methodology 300 can return to 310. Alternatively, the methodology 300 can be ended, for example, by a user.

What has been described above includes exemplary implementations of the present invention. It is, of course, not possible to describe every conceivable combination of modules or methodologies for purposes of describing the present invention, but one of ordinary skill in the art will recognize that many further combinations and permutations of the present invention are possible. Accordingly, the present invention is intended to embrace all such alterations, modifications and variations that fall within the scope of the appended claims.

Having described the invention, the following is claimed:

1. A system for automatically detecting sonar contacts, the system comprising:
    a data analyzer that integrates the raw data from a plurality of sonar detectors over a predetermined period of time, thereby providing integrated data characterizing a sonar image on a sonar display; and
    a Hough transform module configured to employ a Hough transform algorithm that transforms at least a portion of the integrated data to detect a substantially straight line in the sonar image to facilitate detection of the sonar contacts.

2. The system of claim 1, the further comprising an inverse Hough transform module configured to provide inverse Hough data that characterizes the bearing of the one or more sonar contacts as a function of time based on a detection of a substantially straight line by the Hough transform module.

3. The system of claim 2, further comprising a controller configured to output information to a user of the system that characterizes the bearing of the one or more sonar contacts as a function of time.

4. The system of claim 3, wherein the data analyzer is further configured to apply an energy threshold to the integrated data that limits the transformation of the integrated data to integrated data that characterizes a detected energy level above the energy threshold such that the integrated data characterizes a binary sonar image.

5. The system of claim 4, wherein the Hough transform module is configured to identify the location of intersections of lines in a Hough space, and identify a quantity of intersecting lines at each intersection.

6. The system of claim 5, wherein the data analyzer is further configured to merge at least at least a portion of the inverse Hough data to provide contact data that characterizes the bearing of one the one or more sonar contacts as a function of time.

7. The system of claim 6, further comprising a display configured to display the sonar image that is characterized by the integrated data and information that characterizes the contact data simultaneously.

8. The system of claim 1, wherein the predetermined integration time is within a range of about 5 seconds to about 60 seconds.

9. The system of claim 8, wherein the plurality of detectors update the raw data about every second.

10. A passive sonar system comprising the system of claim 1.

11. A method for automatically detecting sonar contacts, the method comprising:
    storing raw data from a plurality of sonar detectors in data storage;
    integrating, by a controller that accesses the data storage, the raw data over a predetermined integration time, thereby generating integrated data, wherein the integrated data characterizes a two-dimensional Euclidian space;
    transforming, by the controller, the integrated data into a Hough space;
    detecting, by the controller, intersecting lines in the Hough space to facilitate detection of the sonar contacts.

12. The method of claim 11, further comprising determining, by the controller, if a number of intersecting lines exceeds a predetermined Hough threshold.

13. The method of claim 12, further comprising inversely transforming, by the controller, the integrated data for data points that exceed the predetermined Hough threshold.

14. The method of claim 13, further comprising clustering, by the controller, data inversely transformed data to provide contact data that characterizes the bearing for detected sonar contacts as a function of time.

15. The method of claim 11, wherein the predetermined integration time is about 5 seconds to about 60 seconds.

16. The method of claim 11, further comprising applying, by the controller, an energy threshold to the integrated data that limits the transforming of the integrated data into the Hough space to integrated data that characterizes a detected energy level above the energy threshold such that the integrated data characterizes a binary sonar image.

17. The method of claim 11, wherein each of the plurality sonar detectors are passive sonar detectors.

18. A method for automatically detecting sonar contacts, the method comprising:
 integrating, by a controller, data into data points that characterizes detected sonar beams from at a plurality of different positions, thereby generating integrated data;
 transforming, by the controller, at least a portion of the integrated data into a Hough space that defines Hough data that characterizes the data points as straight lines; and
 accumulating, by the controller, intersections of the straight lines to facilitate detection of the sonar contacts.

19. The method of claim 18, further comprising inversely transforming, by the controller, the Hough data into a Euclidian space, wherein the Euclidian space characterizes a viewable surface of a display, wherein the means for inversely transforming provides inverse Hough data that characterizes a plurality of lines that each characterize a bearing for a sonar contact as a function of time.

20. The method of claim 18, further comprising clustering, by the controller, the inverse Hough data, the means for clustering merging at least two of the plurality of lines characterized by the inverse Hough data together to facilitate detection of the sonar contacts.

* * * * *